J. M. JOHNSON & H. J. BAUR.
COMBINED FARE AND PASSENGER REGISTER.
APPLICATION FILED NOV. 7, 1910.
1,188,077.
Patented June 20, 1916.
13 SHEETS—SHEET 11.
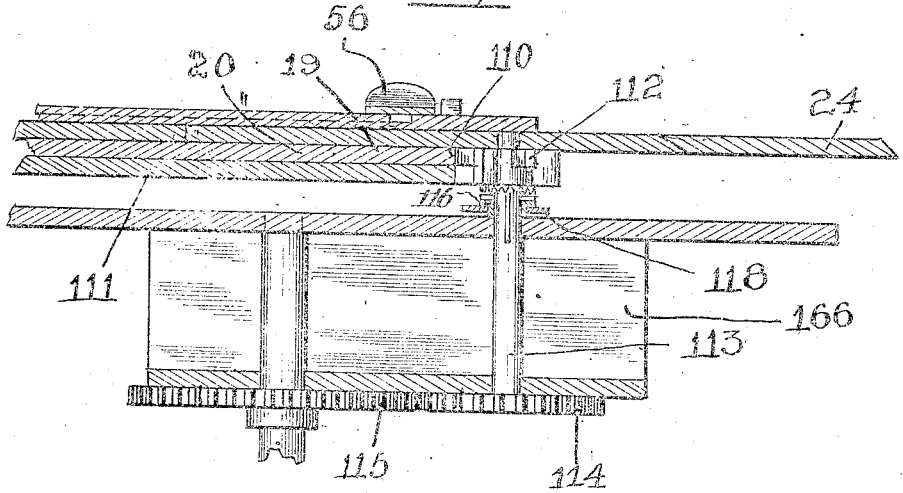
 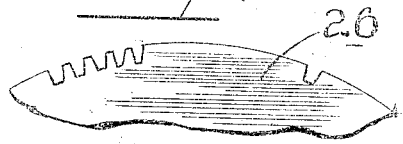
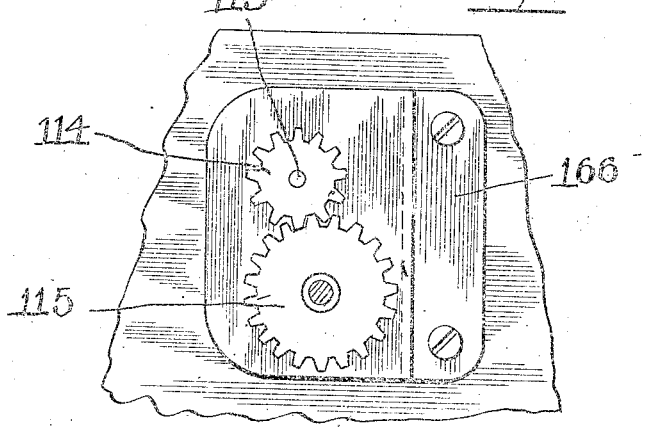
Witnesses
J. W. Angell
Charles W. Hill Jr.
Inventors
Jay M. Johnson
Hugo J. Baur
By Charles W. Hill Atty

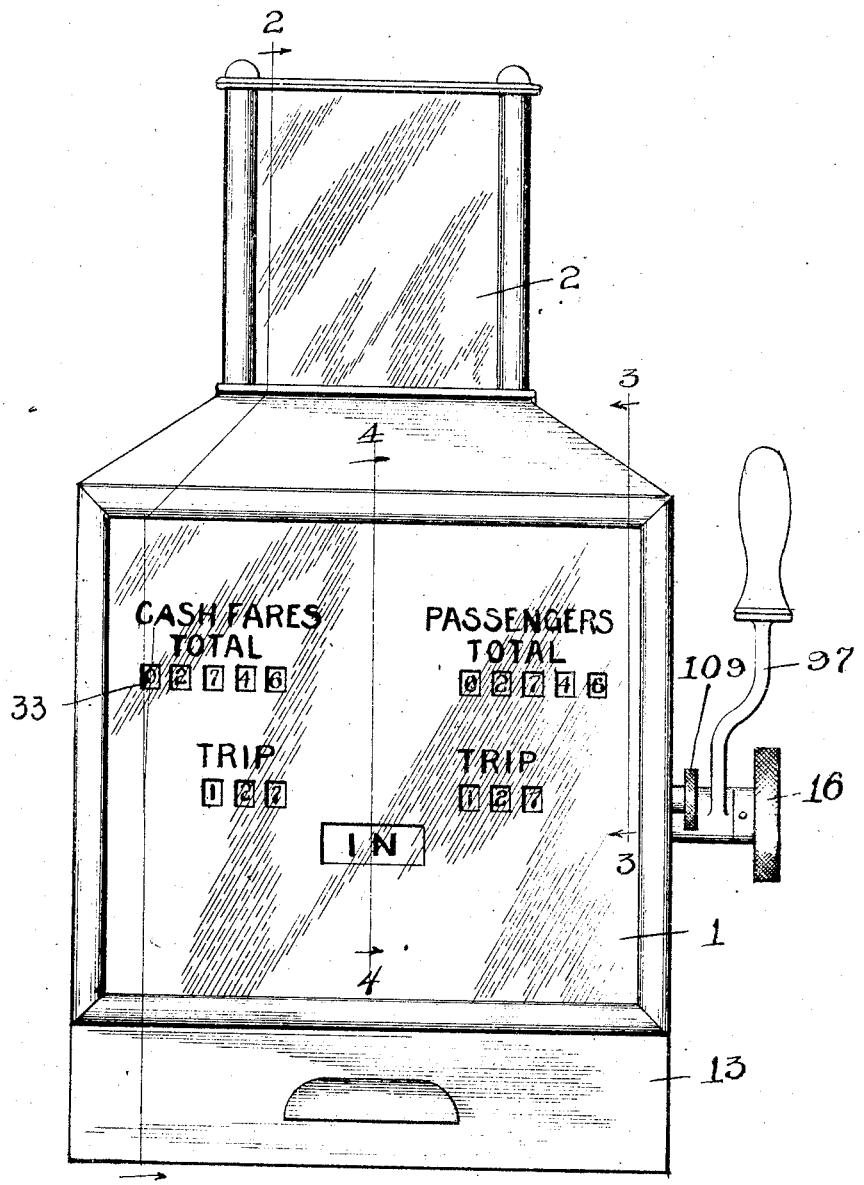

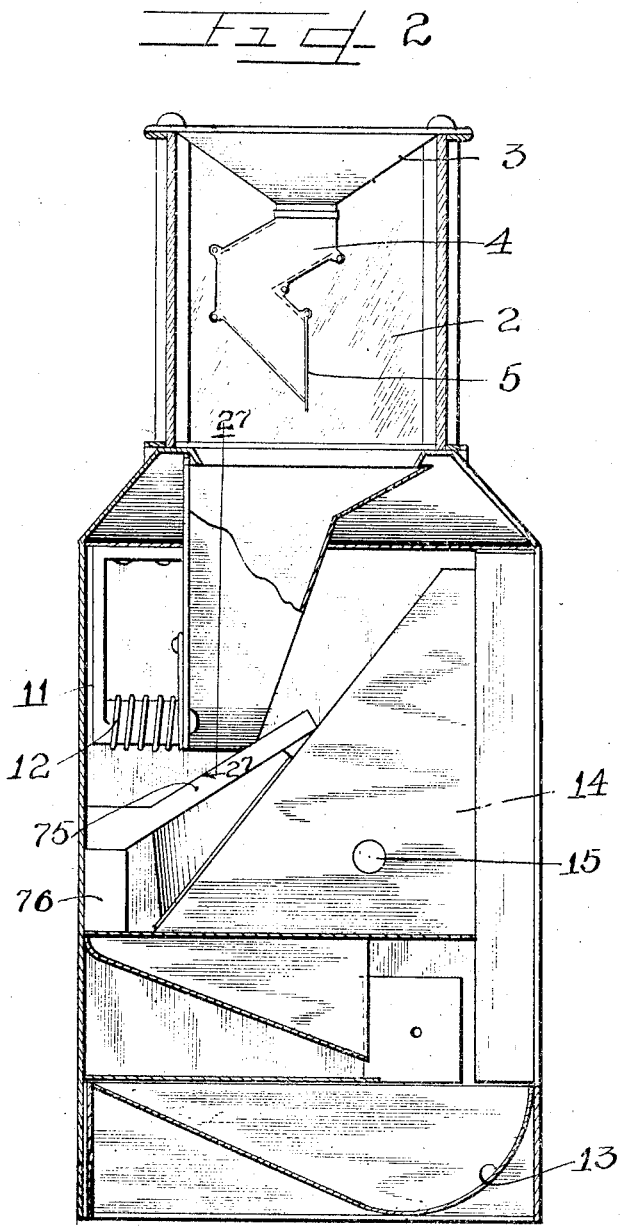

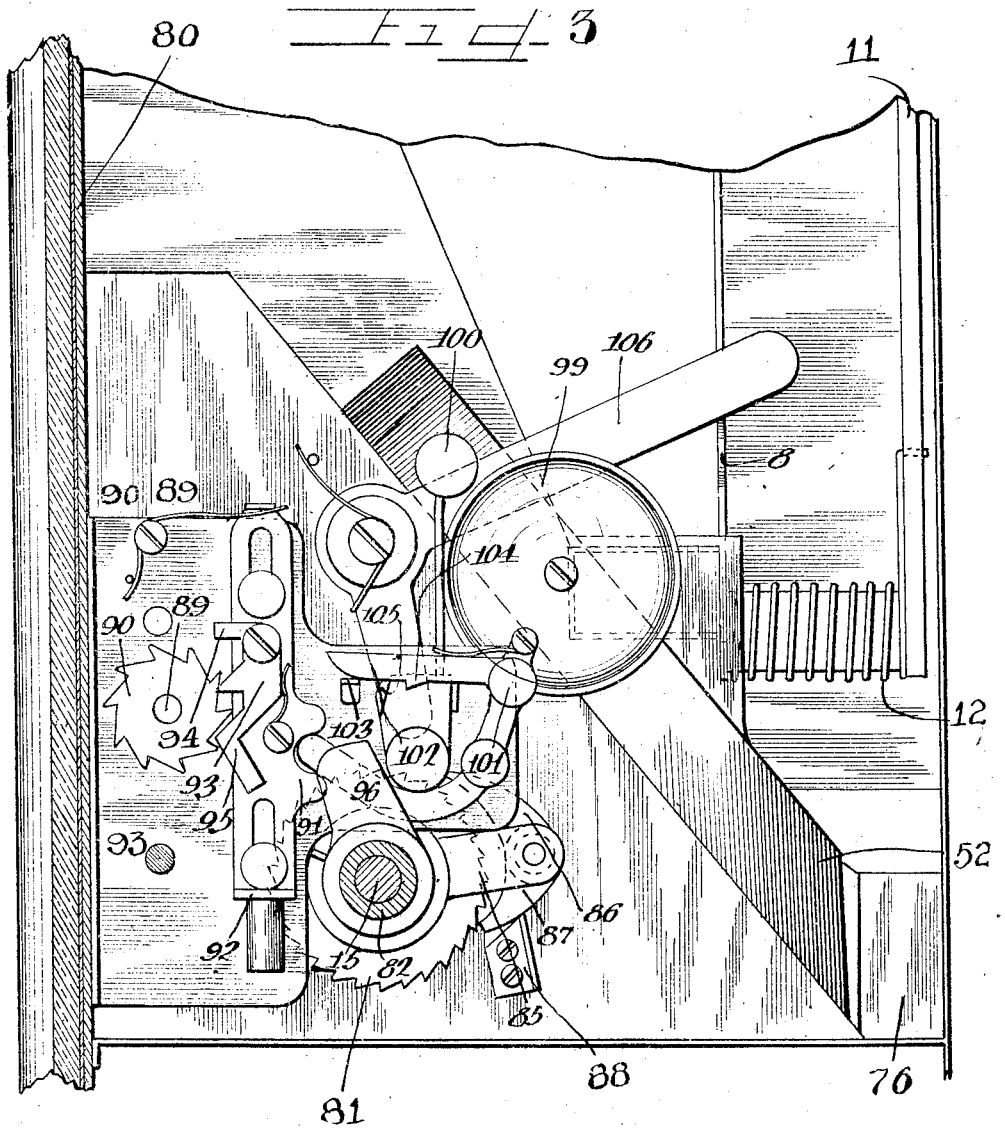

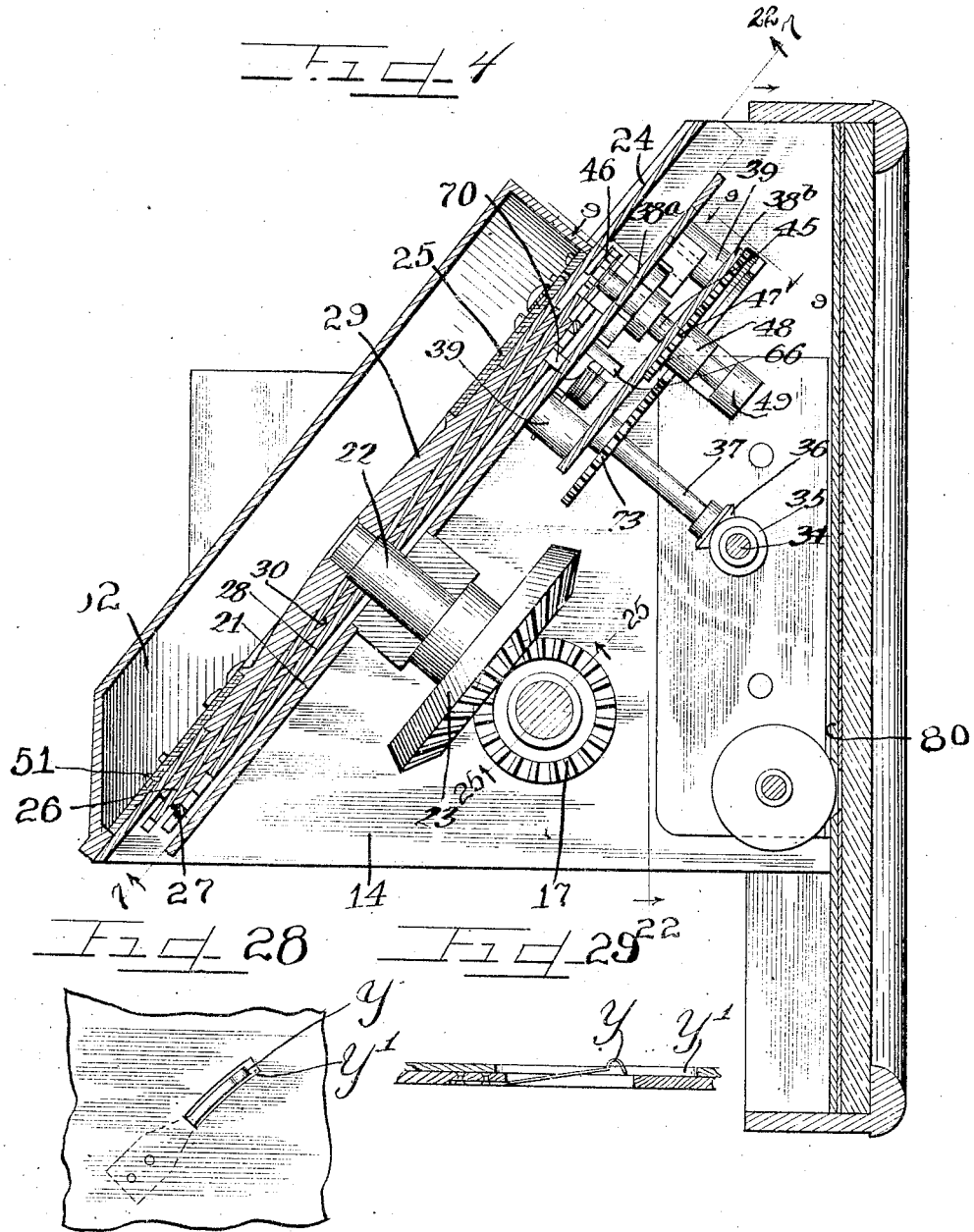

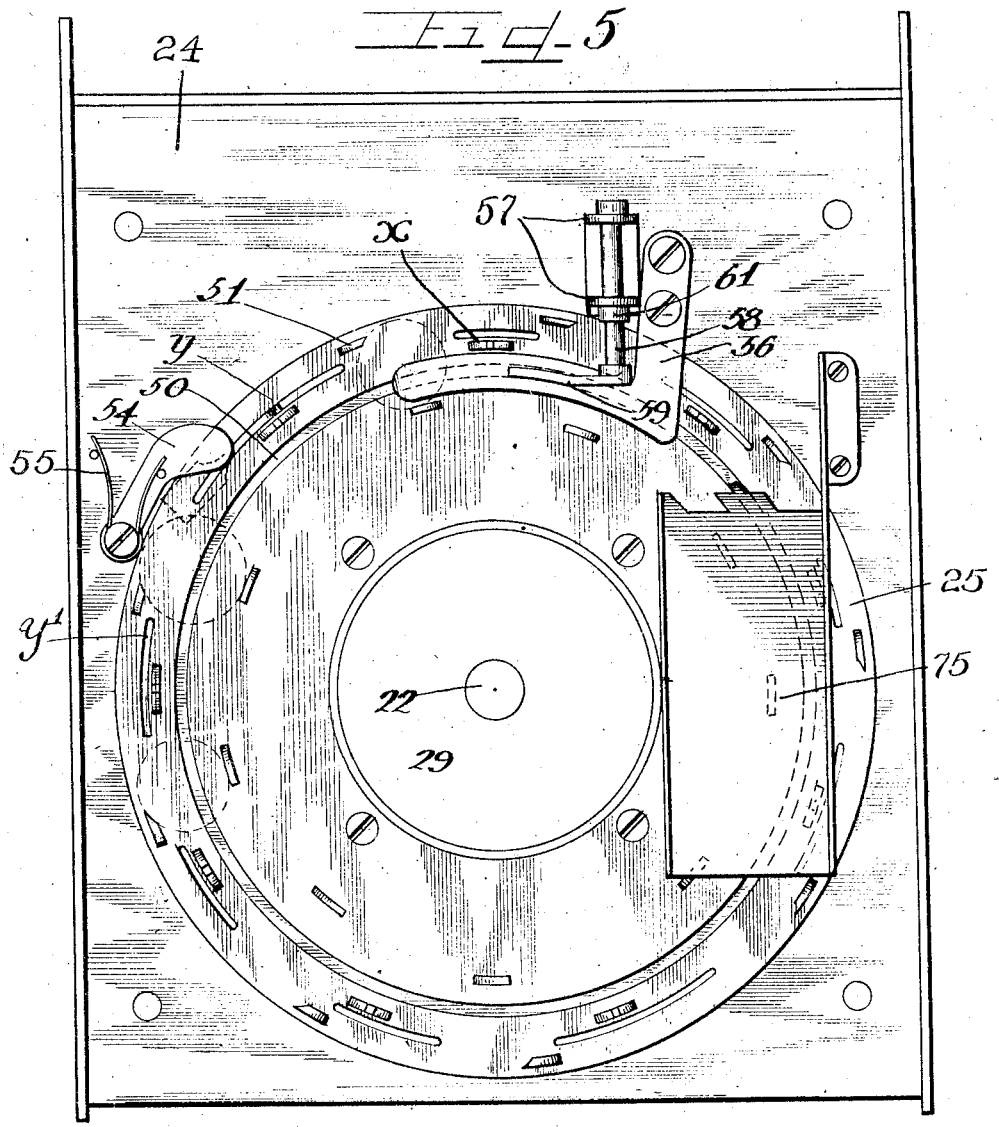

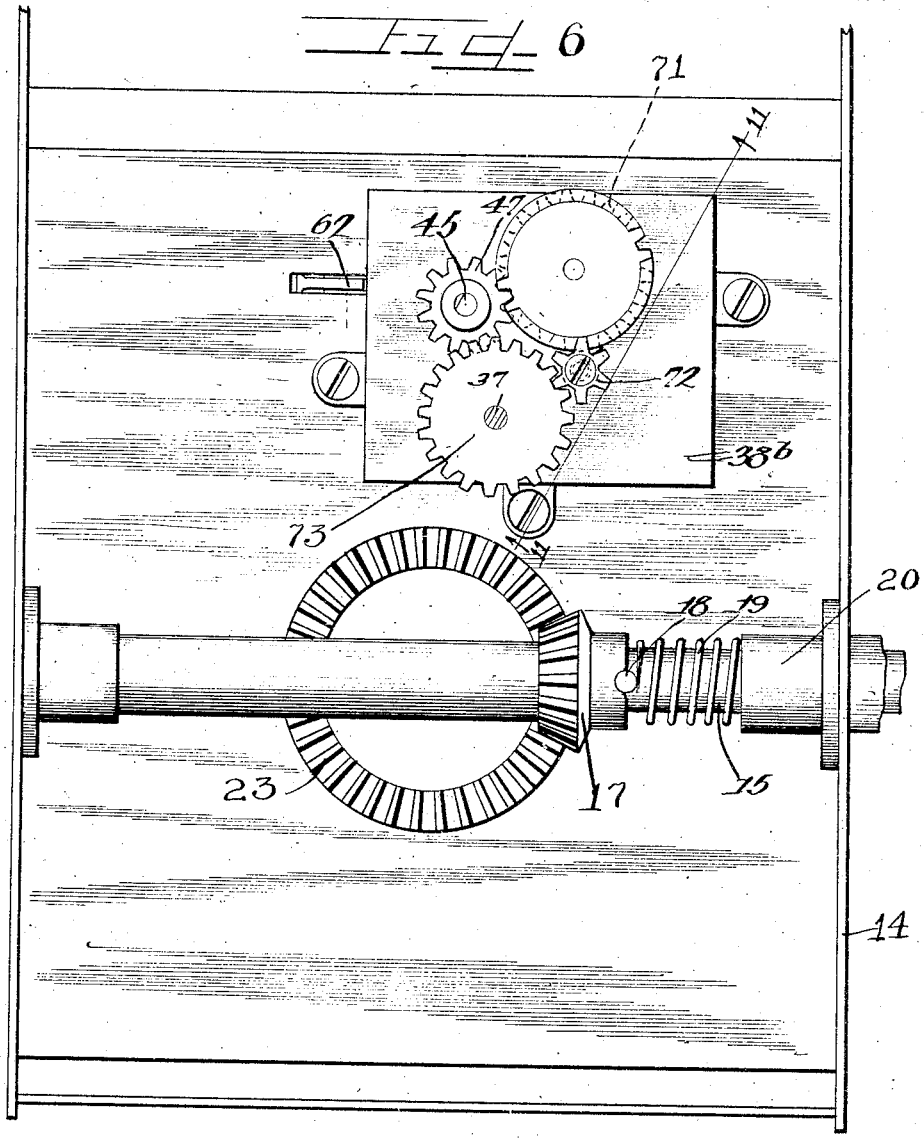

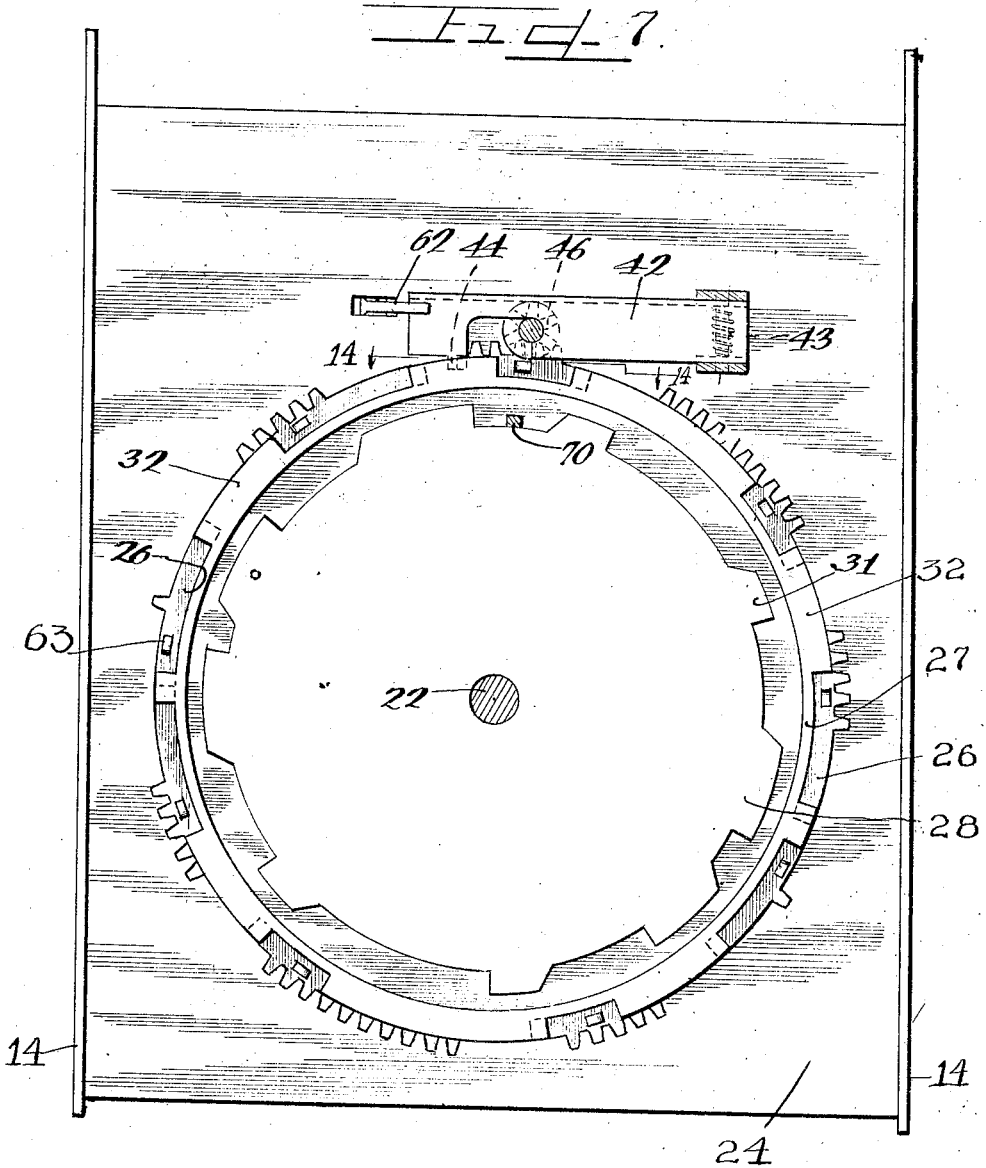

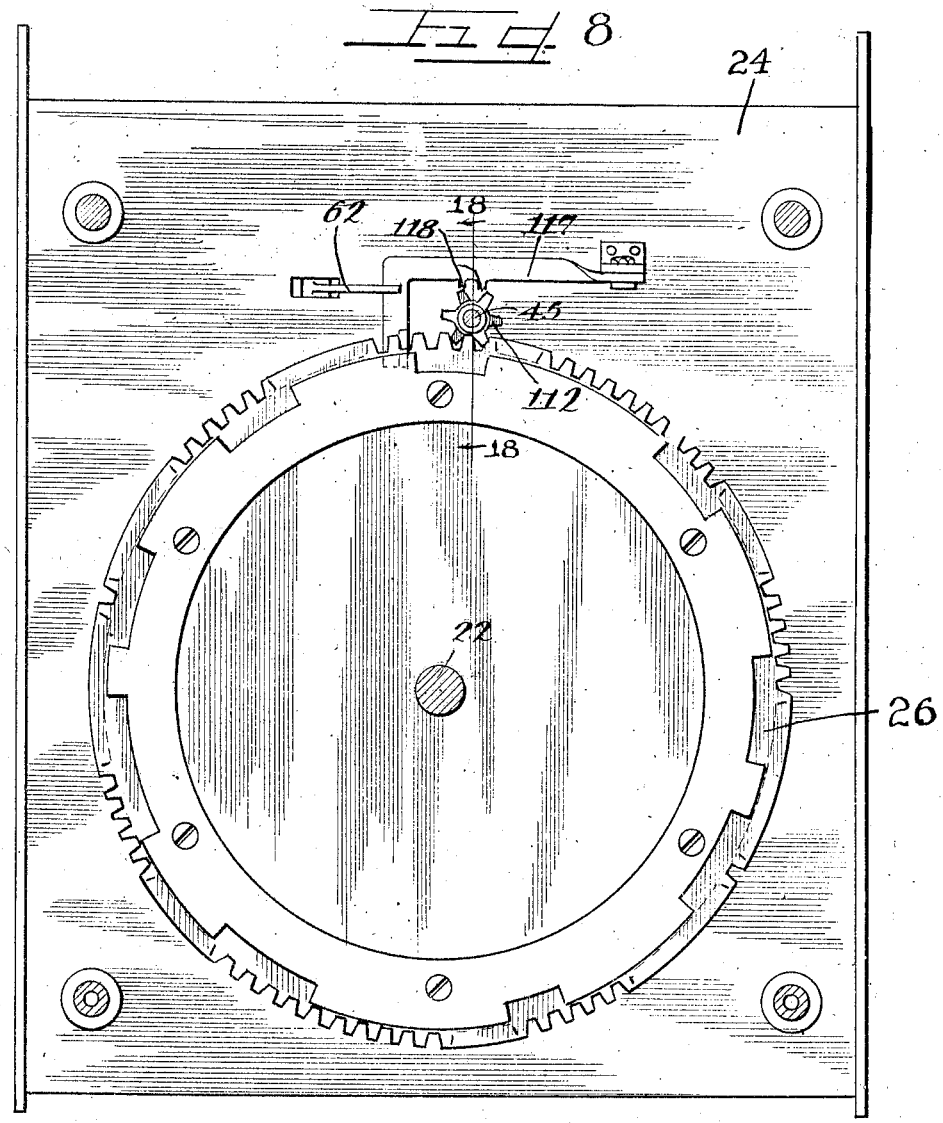

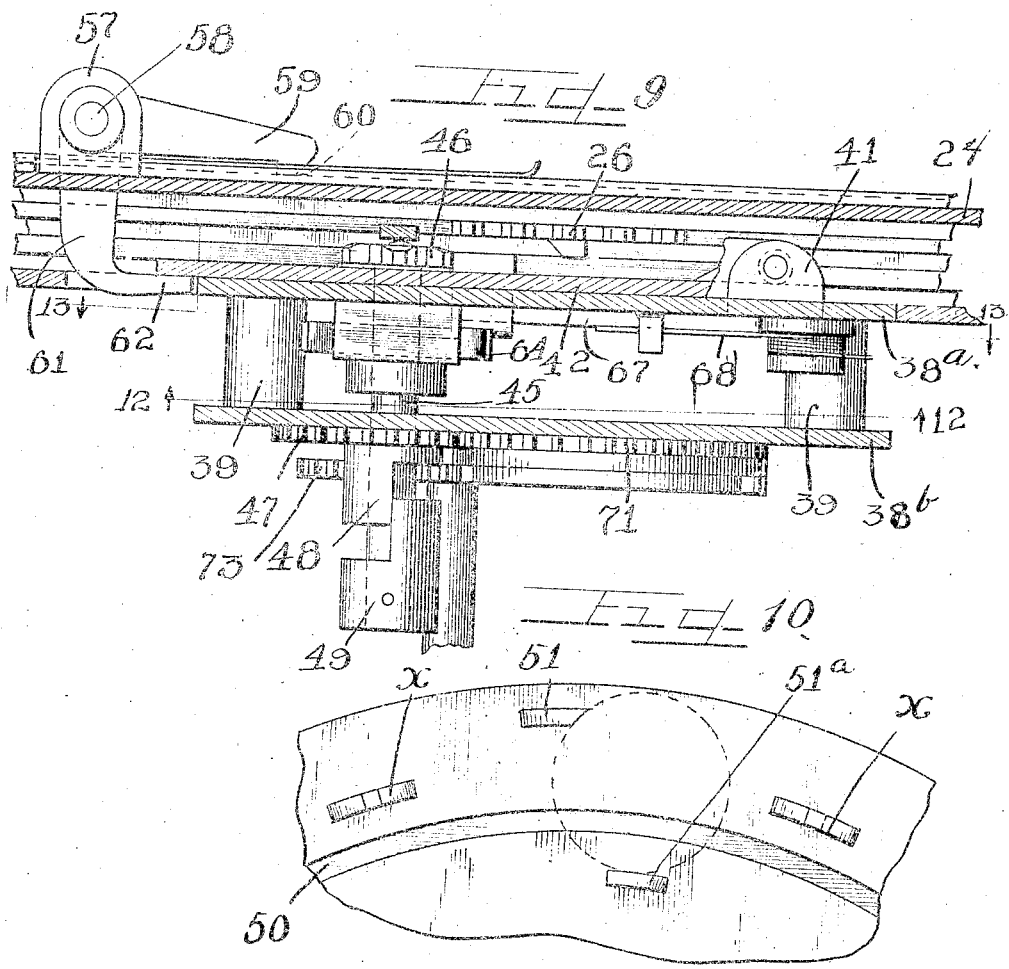

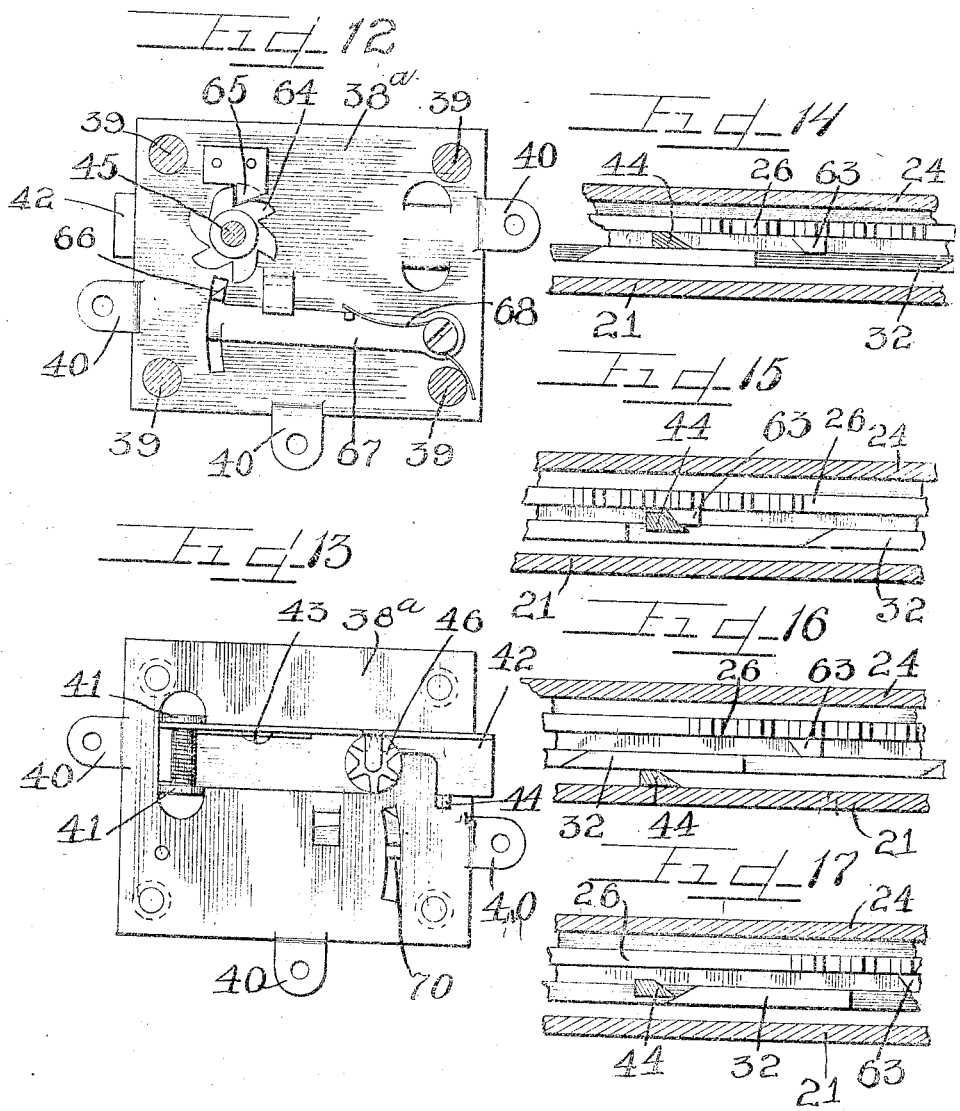

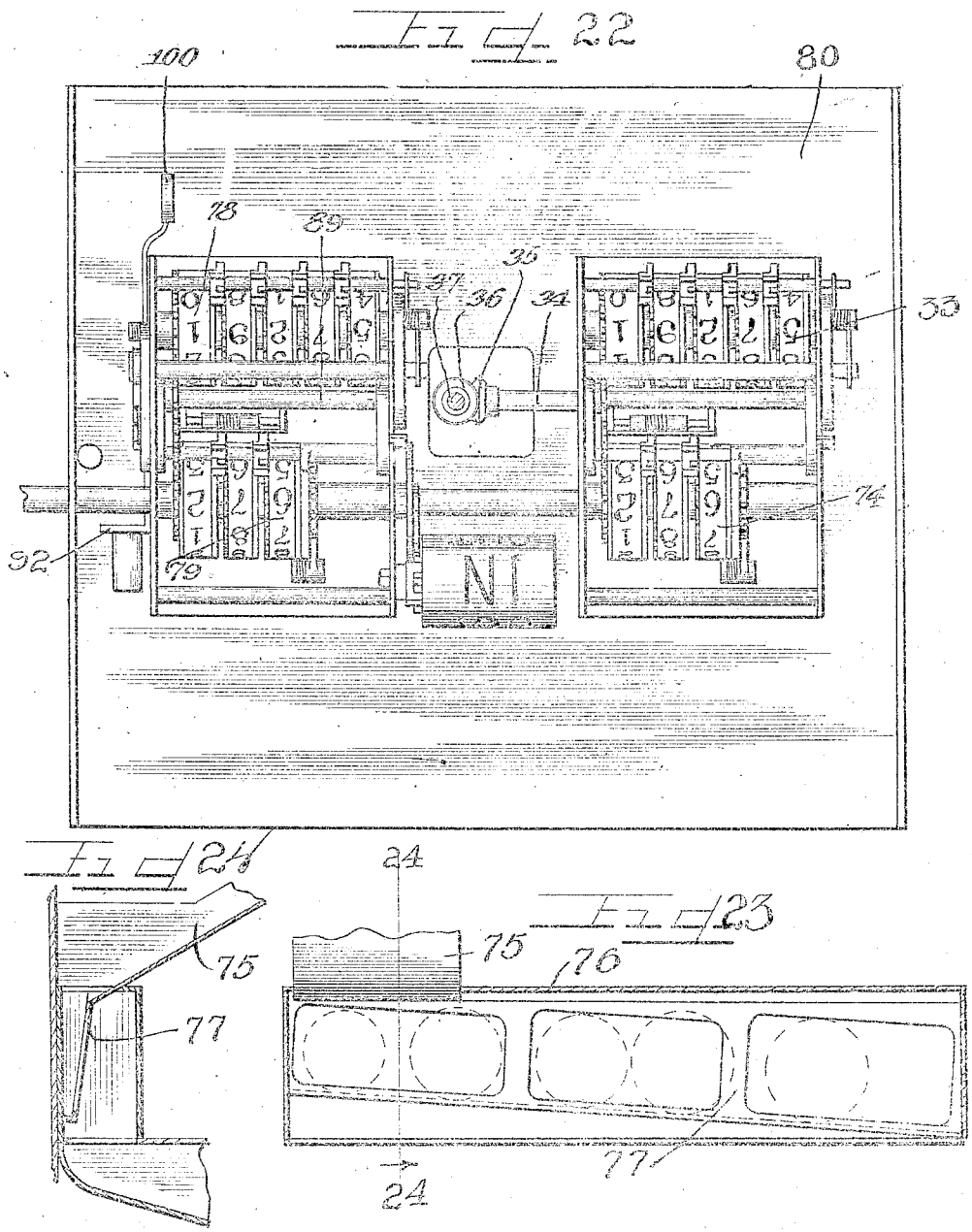

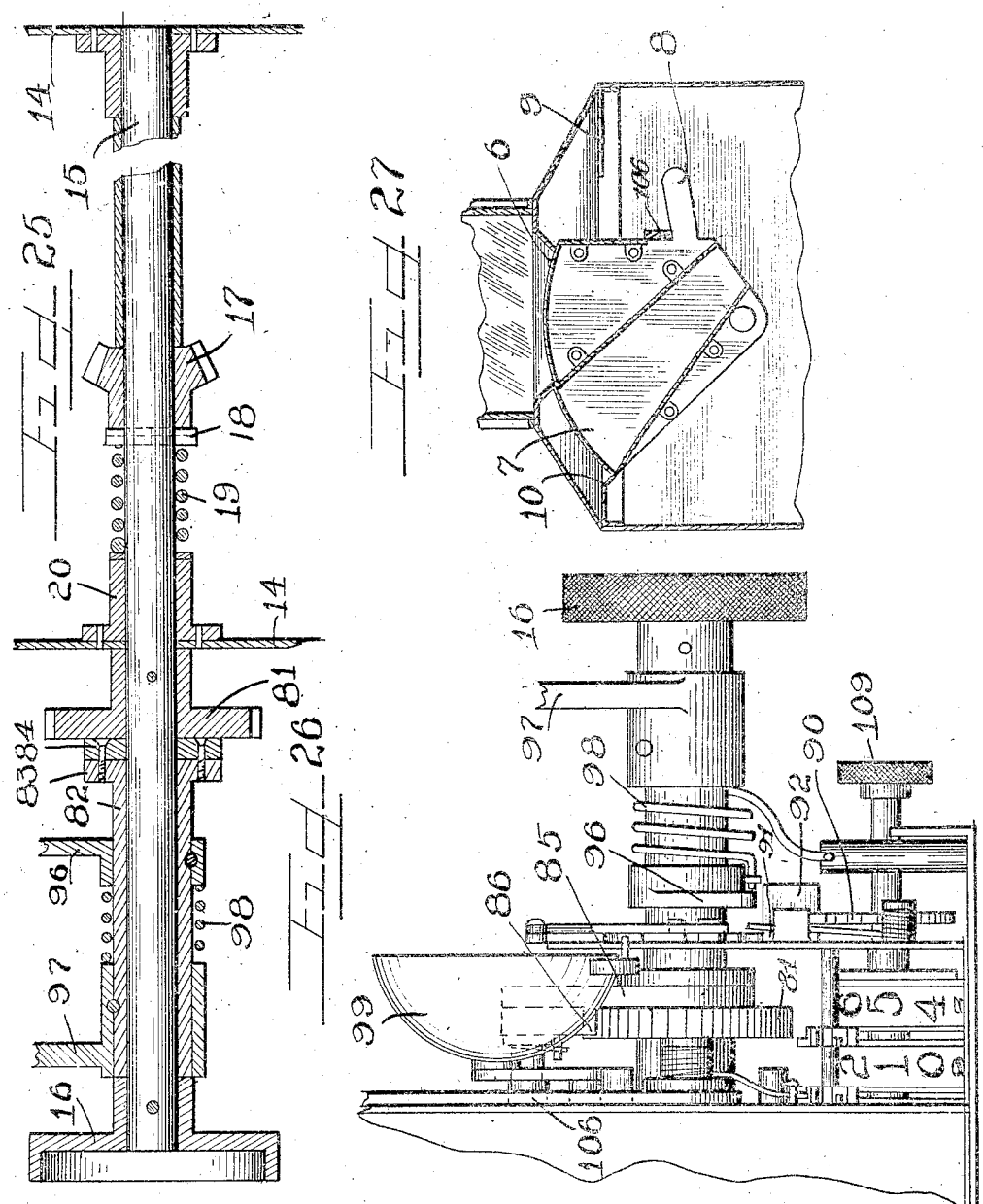

UNITED STATES PATENT OFFICE.

JAY M. JOHNSON AND HUGO J. BAUR, OF CHICAGO, ILLINOIS; SAID BAUR ASSIGNOR TO SAID JOHNSON.

COMBINED FARE AND PASSENGER REGISTER.

1,188,077.   Specification of Letters Patent.   Patented June 20, 1916.

Application filed November 7, 1910. Serial No. 591,093.

*To all whom it may concern:*

Be it known that we, JAY M. JOHNSON and HUGO J. BAUR, citizens of the United States, and residents of the city of Chicago, in the county of Cook and State of Illinois, have invented certain new and useful Improvements in Combined Fare and Passenger Registers; and we do hereby declare that the following is a full, clear, and exact description of the same, reference being had to the accompanying drawings, and to the numbers of reference marked thereon, which form a part of this specification.

This invention relates to improvements in combined fare and passenger registers adapted for general use by transportation companies and others, the nature of whose business renders it desirable to register accurately, uniform payment for service, and the number receiving the service. The various devices of this class heretofore constructed and devised by others, have been unnecessarily complicated and have not always been reliable in that such devices, where installed, have usually been subjected to constant and severe vibration, and in some instances inaccuracy and inefficiency have resulted thereby, so that the owners or users of the device have not been able to rely on the absolute accuracy of operation, and in consequence, the operators, such as conductors and payment collectors, have doubtless at times been subject to unjust suspicion. Furthermore, since devices heretofore could be easily put out of operative condition by careless actuation of the operator, the owners thereafter, of course, could have no check whatever upon the payments collected or the number receiving the service.

It is an object of this invention to afford a construction of extreme simplicity, strength and durability, and so constructed as to insure the utmost reliability and accuracy in operation, and to withstand the shocks, jars and vibration to which it is likely to be subjected without endangering the operation or accuracy of the device.

It is also an object of the invention to afford in a device of the class described a plurality of registers, each separately and independently operated, the one to register the number receiving the service, the other to register the number of fares or payments received and to afford a construction in which one of the registrations is effected by the delivery of the coin or fare or payment through the machine to a place of deposit.

It is also an object of the invention to provide a check upon the collector by affording at the time of the collection and delivery of the fare, an audible signal, a visible signal as to the fare received, and a visible signal as to the entry of the passenger or person receiving the service.

It is also an object of the invention to afford a double registration of the transaction, the one effected through the movement of the coin received for fare or payment, the other effected mechanically by the operator.

Another important object of the invention is to afford in a machine of the class described a positive locking mechanism capable of being released only through the medium of the moving coin or fare, the registration after such release being effected wholly mechanically and independent of the coin.

It is a further object of the invention to afford in a device of the class described a receptacle in which the fare may be viewed after deposit, but before registering, and from which the fare cannot be removed except by discharge to the registering means.

It is also an object of the invention to reduce the number of moving or operating parts to a minimum.

The invention consists in the matters hereinafter described and more fully pointed out and defined in the appended claims.

In the drawings: Figure 1 is a front elevation of a fare box and passenger register embodying our invention. Fig. 2 is a section on line 2—2 of Fig. 1, with parts broken away. Fig. 3 is an enlarged fragmentary section on line 3—3 of Fig. 1. Fig. 4 is an enlarged fragmentary section taken on line 4—4 of Fig. 1, with the fare box removed. Fig. 5 is a front view in elevation of the mechanisms shown in Fig. 4, but with the hopper removed. Fig. 6 is a rear elevation thereof with the fare box or casing removed. Fig. 7 is a section on line 7—7 of Fig. 4. Fig. 8 is a similar view of a slightly modified construction. Fig. 9 is an enlarged fragmentary section taken on line 9—9 of Fig. 4. Fig. 10 is an enlarged fragmentary detail of the coin carrying plate. Fig. 11 is a fragmentary section taken on line 11—11 of Fig. 6. Fig. 12 is a reduced section on line 12—12 of Fig. 9. Fig. 13 is a reduced section taken on line 13—13 of Fig. 9. Fig. 14, 15, 16, and 17 are enlarged fragmentary detail sections on line 14—14 of Fig. 7, and illustrate the operation. Fig. 18 is an enlarged fragmentary section taken on line 18—18 of Fig. 8. Figs. 19 and 20 are fragmentary details of the mutilated and the Geneva gears shown in Figs. 8 and 18. Fig. 21 is a fragmentary rear elevation of the gears which drive the register for fares. Fig. 22 is a view in rear elevation of the total registers for fares and passengers, the trip registers for fares and passengers, and the "in" and "out" indicator with the carrying mechanism and hopper omitted. Fig. 23 is a sectional view of the coin separating chute. Fig. 24 is a section on line 24—24 of Fig. 23. Fig. 25 is a fragmentary section on line 25—25 of Fig. 4. Fig. 26, is an enlarged fragmentary plan view of the manually operated, fare actuating passenger registering signalling device. Fig. 27 is a section on line 27—27 of Fig. 2. Fig. 28 is a fragmentary detail plan view showing the tripping spring. Fig. 29 is a section taken alongside the spring shown in Fig. 28.

As shown in the drawings, the registering and signaling mechanism is inclosed within a fare box conveniently rectangular in cross section and having on the front side thereof, in view of the passengers or those receiving the service, a plate glass wall 1, through which the various visible signals may be plainly seen as hereinafter described. Supported on the top of said box or casing, is a fare receptacle having plate glass or other transparent sides 2, and having on the top thereof a hopper 3, which converges downwardly and centrally to a tortuous passage chute 4, as shown in Fig. 2, closed at its lower end by a gravity acting lid 5, which permits ingress of the coin therethrough, but prevents withdrawal. In the top of the casing or fare box proper, is a pivotally supported shutter constructed of sheet metal or any suitable material and having on its upper side a convexly curved top 6, which serves as a floor for the coin or fare box when in normal position, as shown in Fig. 27, said floor or curved surface corresponding in size with the discharge aperture through the bottom of the coin or fare box. Said shutter adjacent to the closure afforded by said curved plate is provided with a coin passage 7, therethrough and a lever 8, is secured on said shutter and mechanically operated as hereinafter described, to swing the shutter to open position with each actuation of the machine by the operator, and simultaneously with an audible signal effected by such movement by the operator. As shown, stops 9 and 10, are provided in the top of said receptacle to limit the adjustment of said shutter to its fully opened and its fully closed positions. Said shutter is supported in operative position on a bracket 11, rigidly secured in said receptacle, as shown in Figs. 2 and 3, and provided with a spring 12, whereby said shutter is immediately returned to closed position after each actuation. At the bottom of said casing is a drawer 13, securely locked or closed in any suitable manner, and supported above the same on brackets or plates 14, in position to receive the coin or fares delivered through the shutter thereto from the fare box, is the registering mechanisms hereinafter described. Journaled in said bracket plates 14, is an actuating shaft 15, which at one end extends outwardly beyond the casing and is provided with a hand wheel 16, rigidly secured thereon whereby the shaft may be freely rotated. Also secured on said shaft and facing oppositely the hand wheel 16, as shown in Fig. 25, is a bevel pinion 17, normally held from rotation thereon by means of a pin 18, extending through said shaft as shown in Fig. 25, and engaged in a notch in the hub of said gear. A spring 19, bears against the bearing 20, for said shaft on the adjacent bracket 14, and acts to yieldingly hold said bevel pinion in driving position. Secured between said bracket plates 14, near the free inclined edge thereof, is an inclined plate 21, journaled centrally in which at a right angle therewith, is a shaft 22, provided on its lower end with a bevel gear 23 meshing with said bevel pinion 17, as shown in Fig. 4. Secured parallel the plate 21, and near the inclined edge of said bracket plates is a stationary plate 24, having a circular aperture therethrough concentric with the shaft 22, as shown in Fig. 4. Secured on the upper end of said shaft 22, is a composite coin carrying wheel or disk 25, having rigidly connected therewith a mutilated gear and disk 26, a cam or guard ring 27, and a cam plate 28, all rigidly secured together and, of course, movable simultaneously. These elements may be constructed in any suitable manner (even integrally if preferred) but conveniently a relatively thick and heavy plate 29, is rigidly secured on said shaft 22, as shown in Fig. 4, and rabbeted in its face concentric therewith to receive thereon the thin sheet steel carrying wheel or disk 25, which is rigidly secured thereto, as shown in Fig. 25. Said plate 29, is also rabbeted in its face to afford a peripheral recess to receive the plate 24, therein, so that said plate serves as a guide and centering plate lying back of the coin carrying disk 25.

Secured on the rear side of the plate 29, and spaced from the plate 24, thereby, as shown in Fig. 4, is the mutilated gear wheel 26, having arranged thereon at its periphery, groups of gear teeth to correspond with the denomination of the coin to be counted or registered, that is to say, single gear teeth are provided thereon for registering pennies, groups of five for registering nickles and groups of ten for registering dimes, so that the count or register is by pennies or units. Rigidly secured on the rear side of said mutilated gear is a spacing plate 30, and secured thereon and concentric therewith is the cam wheel 28, of less diameter than the mutilated gear and provided with cams 31, on its periphery, one for each group of teeth on the mutilated gear and arranged at the rear thereof from the direction of rotation. Said cam projections 31, have an incline on their front edges and an abrupt face on their rear edges.

Secured on the filler plate 30, concentric with the cam plate in the same plane therewith, is the cam or locking ring 27. This, as shown, is cut away from its periphery inwardly from a point at the rear of one group of gear teeth to near the rear of the next following group of gear teeth affording peripherally and outwardly directed guide plates 32, parallel with the rear faces of the mutilated gear wheel and spaced therefrom a distance equal to the thickness of the filler plate 30. Said guide or locking plates are beveled inwardly at their forward ends, as shown in dotted lines in Fig. 7, and as shown also in Figs. 14 to 17 inclusive, and are of a length to correspond approximately with the groups of teeth on the gear wheel.

Said coin carrying disk 25, is provided in its face with a groove 50, as shown in Fig. 5, and on each side said groove is provided with studs or outstanding short inclined ribs or projections 51 and 51$^a$, which are arranged various distances apart dependent upon the denomination of coin to be counted. The lower portion of the coin carrying disk extends into the hopper 52, into which the coins are delivered from the fare box. Said projections or ribs 51, are so arranged relatively to each other that each pair of said projections is capable of engaging and carrying therebetween but one denomination of coin; that is to say, the projections on opposite sides of said grooves capable of engaging and carrying therebetween a nickel, are sufficiently far apart that a penny or dime may pass therebetween and fall back into the hopper, while the spaces between said studs or projections appropriated for carrying a smaller coin are sufficiently close together that a coin of larger diameter engaged thereby would slide over the inclined faces thereof before being carried to counting position. Intermediate studs or projections X, are provided between adjacent pairs of said studs or projections 51—51$^a$, which act to deflect from the plate any coin lodging on or carried on another coin or lodged on a pair of studs not spaced to receive the same. A tripping spring Y, is secured on the plate 24, above the center of the carrying wheel and near the periphery thereof on the rising side of the wheel with its free end directed upwardly in position to project through slots Y$^1$, in the wheel between adjacent pairs of carrying ribs 51—51$^a$, to strike improperly seated coin therefrom. As shown also, means are provided for knocking or jarring coins imperfectly supported on said coin carrying disk back into the hopper. For this purpose, a spring pressed finger 54, is pivotally engaged adjacent the periphery of the coin carrying disk or wheel with the end thereof resting flat on the face of the same in position to be successively engaged by the coin as they pass upwardly to counting position and pushed out of the path thereof thereby. The tension of the spring 55, is sufficient that any coin imperfectly seated in its carrying projections or lugs in the coin disks will be released thereby to fall back to the hopper. Secured on the plate 24, is a spring plate 56, which lies over the face of the coin carrying wheel to cover the groove 50, therein and in position to avoid contact with the studs or projections 51, on the coin disk.

Pivotally engaged in upstanding brackets 57, is a shaft 58, provided on its outer end with an arm or lever 59, which projects over the spring plates 56, and is provided with an inclined head or finger 60, which projects through a slot therein and into the groove 50, in the coin carrying plate or disk, as shown in Figs. 5 and 9. Also secured on said shaft 58, and extending through a slot in the plate 24, is an arm 61, which projects past the periphery of the coin carrying disk, the mutilated gear, the cam plate and locking ring, as shown in Fig. 9, and is provided with a finger 62, which extends substantially parallel with the arm 59, on the outer side of the coin plate. One or more registers are driven from said coin carrying wheel by means of said mutilated gear wheel. For this purpose, the register indicated as a whole by 33, and which is the fare register, is of any suitable type and driven by the shaft 34. A bevel gear 35, is provided on said shaft which meshes with a bevel gear 36, on a shaft 37, actuated from said mutilated gear.

As shown, parallel frame plates 38$^a$ and 38$^b$, are connected by suitable studs 39, as shown in Figs. 12 and 13, one at each corner thereof, said frame-plate 38$^a$, being set into a complemental opening therethrough in the back plate 21, in which the shaft 22, for the counting disk is journaled, and, as shown, offset straps or lugs 40, integrally connected with the frame plate 38$^a$, are secured on one or more sides or ends thereof and apertured to permit said plates to be screwed into place. Lugs 41, are struck up on the inner side of the plate 38ᵃ, as shown, to afford parallel brackets between which a lever 42, is pivotally engaged at one of its ends, and, as shown, a spring 43, is engaged on the pivot therefor and bears against said lever and acts to hold the same normally flat against the plate 38ᵃ, on the inner side thereof, and adjacent the cam plate. Said lever is adapted to be pressed inwardly against the tension of the spring 43, into close relation with the rear side of the mutilated gear, and is provided near its end remote from the pivot bearing therefor with a tooth or finger 44, adapted when the lever is swung inwardly to engage within the inclined end of the locking plate 32, as shown in Fig. 17, and to be drawn thereby inwardly into the locking groove at the rear of the mutilated gear to be held therein until the guide projection 32, on said locking ring is revolved past the same. This inward movement of said lever 42, is effected by the moving coin carried by the coin disk which forces the arm 59, outwardly from the disk and thereby throws the arm 62, upwardly, carrying the end of the lever 42, which is engaged thereby, therewith, as shown in Fig. 9.

As shown, a shaft 45, is journaled transversely in the plates 38ᵃ and 38ᵇ, and extends through the lever 42, as shown in Figs. 4 and 9, and is provided on its inner end with a pinion 46, rigidly secured thereon, adapted to mesh with the mutilated gear and to be rotated thereby to an extent dependent upon the coin being registered. Said shaft 45, is provided with a gear wheel 47, secured thereon on the outer side of the plate 38ᵇ, by a clutch formed by halving the hub 48, together with a duplicate clutch member 49, rigidly secured on the end of said shaft, and sufficient space being afforded between the parts of the clutch member so that while the clutch is always engaged, there is nevertheless space for sufficient longitudinal movement of the shaft to permit the pinion 46, thereon to be brought into engagement with the mutilated gear. The spring 43, provides quick release of the pinion 46, from the mutilated gear when the finger 44, clears the end of the guide plate 32, which previously held the same in engagement, and to insure such release and obviate any possible tendency to error because of a weak spring or for any other reason, inclined studs 63, are provided on the rear side of the mutilated gear, one closely adjacent to the rear end of each of the guide plates 32, as shown in Fig. 7. These strike the finger 44, as indicated in Fig. 15, and force said arm or lever 42, outwardly.

It is important to positively lock the shaft 45, from overthrow, inasmuch as said shaft actuates the registers for the fares both total and trip. For this purpose, a ratchet wheel 64, is secured on said shaft 45, as shown in Figs. 9 and 12, and secured on the plate 38ᵃ, and extending outwardly therefrom is a stationary detent 65, adapted to engage said ratchet wheel, as shown in Fig. 12, and hold the same firmly from movement when the gear 46, is retracted from the mutilated gear, and to further insure the registers from shifting because of vibration or from any other cause other than the registering of a coin, a detent 66, is provided on a lever 67, pivotally engaged on the outer face of the frame-plate 38ᵃ as shown in Figs. 9 and 12, engaged by a spring 68. Said detent 66, projects rearwardly from the plate 38ᵃ, sufficiently to engage said ratchet at any point in its adjustment from or toward the plate, but is normally held from engagement therewith by said spring. A slot is provided in said frame-plate 38ᵃ, and secured on said lever 67, and projecting therethrough is a finger 70, which extends inwardly into position to be engaged by the cam projections 31, on the cam plate 28, and said cam projections 31, are so arranged with reference to the mutilated gear teeth and the guide projections 32, that said finger 70, is supported on said cam projection at all times when the pinion 46, is out of engagement with the mutilated gear, and is released from said cam projection at the moment that the lever 42, is thrown inwardly to spring said pinion into engagement with the mutilated gears. Thus at all times the actuating pinion for the registers is firmly held from movement except when positively driven by the mutilated gear teeth.

The drive to the registers, both total and trip for the fares, may be effected from the shaft 45, in any suitable manner. As shown in Figs. 4, 6, and 11, however, the sliding pinion 47, on the shaft 45, has twice the number of teeth as the pinion 46, driven from the mutilated gear, and meshes with a gear wheel 71, having twenty teeth thereon and secured to which is a Geneva gear having recesses on diametrically opposite sides thereof to receive the teeth of a pinion 72, which mesh with the gear 73, on the shaft 37, which actuates the register, thus transferring the count of the number of fares to the register 33. As shown, the total fare register 33, is connected through intermeshing gears with the trip fare register 74. For these registers, any suitable or familiar type of set-back registering mechanism may be employed.

The coin having passed beneath the spring 66, and bell crank lever 59, passes rearwardly to a chute 75, on the rear edge the coin carrying wheel, as shown in Fig. 5. This chute is provided with a narrow tongue, which projects into the narrow slot or groove in the face of the coin disk and thereby acts to displace or dislodge the coin from the projections 51, carrying the same, whence the coin slides by gravity down said chute and thence into an inclined trough 76, one side 77, of which is inclined outwardly and is provided with slots therethrough extending from near the bottom of the trough to near the top thereof, and becoming successively wider. Said slots from a point near the chute 75, are of a width to permit only the smallest coin, or dimes, to fall therethrough and thence to pass by gravity to a suitable receptacle therefor in the drawer. The next succeeding slot is sufficiently large to permit pennies to fall therethrough and into their proper chute for delivery to the penny receptacle. The next succeeding slot is of a size to permit nickels to discharge thereto into the nickel chute, thereby separating the coins into their denominations as the coins are counted.

The passenger registers, both total and trip, are actuated mechanically by the operator and entirely independently of the coin deposited in the machine. For this purpose, the total passenger register 78, and the trip passenger register 79, are secured upon the front plate 80, of the machine, as before described with reference to the total fare registers and trip registers 74, and in close relation to the operating shaft 15. Pinned to the shaft 15, to bear against the bracket 14, for the coin actuated mechanism, is a ratchet wheel 81, and rotatably secured on the shaft 15, is a sleeve 82, having a collar 83, on the inner end thereof to which is secured a collar 84, having an arm 85, thereon, as shown in dotted lines in Fig. 26. Secured on said arm is a pawl 86, having the engaging end thereof above the shaft directed toward the registers and adapted to engage said ratchet wheel 81, to rotate the same, and thereby the shaft 15. The lower end 87, of the pawl 86, is bent inwardly toward the ratchet wheel 81, in position to be engaged by a projection 88, on the bracket 14, to release the pawl from the ratchet when the device is at normal position.

Secured on the outer end of the shaft 15, is the hand wheel 16, which permits said shaft to be rotated manually within the sleeve 82, thereby acting to clear the hopper, if desired, without actuating the passenger registers.

As shown, the total passenger register 78, and the trip passenger register 39 are both driven from the shaft 89, through the medium of intermeshing gears on the shafts therefor, and which, inasmuch as the same may represent any suitable registering mechanism, are not described herein. A ratchet wheel 90, is provided on the outer end of the shaft 89, however, which actuates said registers, and this ratchet wheel is driven by a suitable connection with the operator's lever. For this purpose, as shown, a vertically sliding bar 91, is secured upon the end frame member for the register, as shown in Fig. 3, and is provided at its lower end with an outwardly directed lip or projection 92, and is provided on its inner edge or that adjacent the shaft 15, with a notch or recess, as shown in Fig. 3. Pivotally secured on said slide bar 91, in position to engage the teeth of said ratchet wheel one by one, is a pawl 93, provided above the same with a finger 94, and below the same with an outwardly directed bend 95, which acts to limit the throw of said pawl on said gear to a single tooth with each actuation. Rigidly secured on said sleeve 82, is an arm 96, positioned to engage the lip or projection 92, on said slide bar to force the same downwardly to the limits of its travel when the sleeve 82, is actuated by the operator's lever 97. As shown, a spring 98, is wound about said sleeve between the operating lever 97, and the arm 96, and rigidly engaged on one of the same and on a fixed point on the frame or other suitable stationary part of the mechanism, to return the shaft to normal after each actuation of the operator.

An audible signal is afforded with each passenger registered. For this purpose, a bell or gong 99, is secured upon any suitable standard or upon the bracket plate 14, or any suitable support in position to be struck by a hammer 100. As shown, a bell crank lever 101, is pivotally engaged upon a suitable standard, as, for instance, the frame plate for the register extended for that purpose. The lower end of said lever is bent downwardly and forwardly and engages in the recess therefor on the inner edge of the slide bar 91. Pivotally engaged on the upper end of said lever 101, is a forwardly directed bar 102, which rests at its forward end upon a projection 103, on said frame plate, as shown in Fig. 3, and is provided on its under side with a forwardly directed finger or projection 104, adapted to engage a projection or lug 105, on a part connected with the hammer 100, and acting when said slide bar is forced downwardly to retract the hammer until the projection or finger 104, on the bar 102, is withdrawn from the projection 105, by the swing of the hammer on its pivot bearing, thereupon releasing the hammer which is impelled by its spring to strike the bell or gong. Each actuation of the operator's lever also drops the coin from the coin box into the hopper. For this purpose, a bell crank lever is pivotally engaged on the frame plate 14, and comprises an arm 106, which extends into the machine into position to engage the arm 8, on the shutter shown in Fig. 27. The other arm of said bell crank extends downwardly into position to be engaged by a pin or projection carried on the arm 85. Conveniently, the pivot pin for the pawl may be extended sufficiently for that purpose.

The operation is as follows: On the face of the machine in plain view of the passengers or those receiving the service, are apertures for the cash fare totals and trip and the passenger total and trip, and between the same the trip indicator, which comprises a rotative cylinder or roller marked on its periphery with the words "In" and "Out." The registers are carefully examined before installation for each "out" trip and the money drawer is, of course, emptied. The trip registers are set by means of the setback shaft 109, of the usual type, to nought. The passenger deposits his fare by dropping the same in the fare box, where it is supported upon the convex surface of the shutter in plain view of the passenger. Upon the passenger depositing his fare, the conductor registers the same by pulling the lever 97, forwardly once to its stop. This opens the shutter to permit the fare to fall to the hopper for the coin carrying disk, rings the bell or gong, and registers the passenger on the total passenger register and on the trip passenger register, and upon the lever being released, the spring 98, returns the lever to normal. Each actuation of the lever 97, turns the coin carrying wheel or disk, thereby carrying the coin upwardly on said wheel toward registering position. The inclined position of the coin carrying wheel causes any coin not lodged between the appropriate projections, to fall therefrom to the hopper, and should this movement be delayed until the displacing finger 54, is reached, said spring impelled finger releases the coin from the wheel and causes it to fall to the bottom. Properly placed coin, however, are carried upwardly around the wheel and beneath the leaf spring covering the groove 50. The resiliency of said leaf spring is such that it exerts slight resistance to the coin passing therebeneath and rises freely thereover but holds the coin in place on the coin wheel so that when the bell crank arm 59, is reached and raised by the coin, the first movement in registering begins; that is to say, the upward movement of the arm 59, serves to swing the lever 42, inwardly toward the carrying elements until the finger 44, thereon, is engaged by the inclined end of the guide plate 32, thereby drawing the pinion 46, into position to mesh with the mutilated gear teeth appropriate to the coin to be counted, viz., should a penny have passed beneath said arm 59, a single gear tooth will be in position to engage said pinion 46, while five teeth are arranged opposite the carrying projection for nickels and ten teeth opposite the carrying projection for dimes. Inward movement of the shaft 45, actuated by the lever 42, shifts the ratchet wheel 64, out of engagement with the fixed detent 65, therefor, and at the same moment the inwardly projecting finger 70, on the lever 67, clears the raised cam faces it had previously been supported upon and falls under the action of its spring 68, into the recess at the rear end of said cam face, thus leaving the shaft 45, free to turn to an extent determined by the number of teeth on the mutilated gear at that station. This rotation of the shaft is communicated as before described to the fare registers and any suitable connections for this purpose such as described or otherwise may be employed. As the throw of the last tooth of the mutilated gear group nears completion, the finger 44, is released from the guide plate 32, previously holding the lever 42, inwardly and simultaneously the inclined projection 63, secured on the rear side of the mutilated gear engages said finger and instantly throws said lever 42, assisted by its spring, to normal, thus shifting the pinion 46, out of operative relation with the mutilated gear and simultaneously throwing the ratchet wheel 64, into engagement with the fixed detent 65, while at the same moment the inclined face of the cam projection 31, strikes the finger 70, on the lever 61, throwing said lever upwardly so that the detent 66, thereon also engages said ratchet wheel firmly locking the same from movement. After the coin has passed beneath the lever 59, it performs no other function in counting, the only action of the coin at any time being to release and shift the previously locked mechanism to permit the same to pass into operative relation. Thereafter the coin passes to the rear, is discharged from the carrying plate in the chute 75, falls down the incline in the inclined chute or runway 76, and falls by gravity therefrom into the particular compartment in the coin drawer appropriated therefor.

Of course, there are numerous ways in which the mechanism for registering the fare may be brought *en train* through the medium of the passing coin. For example, a cam plate or wheel as such may be omitted and a mutilated gear 110, such as before described, secured at the rear of the coin carrying plate and having attached thereto a Geneva gear plate 111, having appropriately arranged stops and throws thereon. A pinion 112, may be pivoted in the frame plate 24, and presents a clutch face rearwardly toward a shaft 113, in axial alinement therewith and provided on its rear end with a gear wheel 114, driving in any suitable manner to the gear wheel 115, for the register. The guide plate 166, may be secured on the rear of the Geneva gear plate or wheel as before described, and splined on the inner end of the shaft 113, is a clutch member 116, complemental with the clutch on the Geneva pinion 112. A lever 117, is pivoted on the frame plate 24, in any suitable manner, and the end 62, of the bell crank (which is actuated by the passing coin) engages behind said lever 117, as shown in Fig. 8, to draw the end thereof within the channel between the guide plate 166, and the gears. A fork or yoke 118, is provided on said lever, which engages the hub of the clutch member 116, to draw the same inwardly to engage the complemental member on the hub of the Geneva pinion. In this manner, whenever the lever 59, is raised by the passing coin and the lever 62, thrown upwardly thereby, said clutch is thrown into engagement to be instantly disengaged at the end of the throw of the mutilated gear, at which time, the Geneva wheel will again engage the Geneva pinion to hold the same from further movement until the next actuation by a passing coin.

Of course, numerous other details of construction may be varied. We have, however, shown and described but one (and that a simple and preferred) form of our invention, by means of which an audible signal is afforded with each fare or passenger register, in which the coin is exposed to view until the passenger has registered and in which two independent registering mechanisms are employed, the one to act as a check upon the other; the one operated mechanically and brought into operation by the fare received, the other operated manually and unavoidably by the operator as he discharges the fares from the fare box into the machine, and both positively locked from operation until positively actuated. We therefore do not purpose limiting this application for patent otherwise than necessitated by the prior art, for we are aware that numerous details of construction and operation may be varied without departing from the principles of this invention.

We claim as our invention:

1. In a device of the class described a coin carrying wheel, pairs of projections on the face thereof, the projections of each pair spaced a distance apart to selectively and singly engage from a mixed group and to carry coin of a given denomination only therebetween, and projections between adjacent pairs.

2. In a machine of the class described an inclined rotative coin carrying wheel, projections on one face thereof arranged in pairs at different distances apart, the distance between the projections of each pair being such that a coin of one denomination only can be engaged and carried thereby and a projection between adjacent pairs for displacing surplus coin.

3. In a machine of the class described a rotative carrying wheel, projections on one face thereof arranged in pairs at different distances apart, the distance between the projections of each pair being such that a coin of one denomination only can be engaged and carried thereby, a projection between adjacent pairs of projections and a mechanical displacer acting to displace surplus coin.

4. In a machine of the class described an inclined rotative coin carrying wheel, a register driven positively but intermittently by said wheel, projections on one face of said wheel arranged in pairs at different distances apart, the distance between the projections of each pair being such that a coin of one denomination only can be engaged and carried thereby, and means operated by each moving coin acting to bring the register into operation.

5. In a machine of the class described an inclined rotative coin carrying wheel, a register, a gear train normally out of train for driving the register, projections on one face of said carrying wheel arranged in pairs at different distances apart, the distance between the projections of each pair being such that a coin of one denomination only can be engaged and carried thereby, and a shifting device actuated by successively passing coin to bring said gear into train to actuate the register suitably to register the same.

6. A machine of the class described embracing an inclined rotative coin carrying wheel, projections on one face thereof arranged in pairs, one near and the other more remote from the periphery, the distance between the projections of each pair varying for each pair to receive and to carry each a single coin therebetween, a coin registering mechanism, and means actuated by the moving coin acting to bring the registering mechanism into operation.

7. A machine of the class described embracing an inclined rotative coin carrying wheel, projections on one face thereof arranged in pairs near and at different distances from the periphery thereof, and one slightly in advance of the other, the distance between the projections of successive pairs being such that each can receive and carry a coin therebetween, a registering mechanism, and operating means brought in action by the coin acting to bring the registering mechanism into operation.

8. A machine of the class described embracing a rotative coin carrying wheel, projections thereon arranged in pairs, the distance between the projections of each pair being such as to selectively receive and to carry therein a penny, a dime or a nickel respectively, a mutilated gear on the periphery of said wheel, the teeth arranged in groups to correspond with the number of units in the coin carried between the adjacent pairs of projections, a fare registering mechanism, a driving gear therefor normally out of mesh with said mutilated gear, and means actuated by the moving coin acting to shift the same into mesh.

9. A machine of the class described embracing an inclined rotative coin carrying wheel, projections on one face thereof arranged in pairs transversely the wheel and near the periphery thereof, the inner slightly in advance of the outer, the distance between the projections of each pair being such as to receive and carry a coin, a coin registering mechanism normally held out of action, driving means therefor, and means actuated by the moving coin acting to entrain the registering mechanism with said driving means.

10. A machine of the class described embracing an inclined rotative coin carrying wheel, projections on one face thereof arranged in pairs near and at different distances from the periphery thereof, and one slightly in advance of the other, the distance between the projections of each pair being such as to receive and carry a coin therebetween, a coin registering mechanism normally held in inoperative position, and means actuated by the moving coin acting to bring the registering mechanism into operative position.

11. A machine of the class described embracing an inclined rotative coin carrying wheel, means adapted to selectively receive and carry coin thereon to a place of discharge, parts thereof appropriated to the different denominations of the coin respectively, a registering mechanism, coacting means thereon and on the coin carrying wheel but normally out of train, for actuating said register appropriated for each coin, a lever actuated by the coin acting to bring the registering mechanism intermittently into train with the coin carrying wheel, and detents movable with the coin carrying wheel for normally holding the registers out of train with said wheel.

12. A machine of the class described embracing an inclined rotative coin carrying wheel, means on one face thereof for selectively engaging and carrying the coin one by one and systematically arranged on the wheel as to denomination to counting position, fare registering mechanism, positively acting driving means therefor on the coin wheel, means normally holding the register out of train therewith, and a mechanism actuated by the moving coin acting with said wheel.

13. A machine of the class described embracing an inclined rotative coin carrying wheel, means on one face thereof for selectively engaging in predetermined positions thereon and carrying coin of different denominations, a coin registering mechanism, means actuated by the moving coin acting to bring the registering mechanism into operative position, and means normally holding the actuating means for the registers out of train.

14. In a fare register a receptacle for the fare, an inclosed gong, a passenger register, a hand lever, connections therewith for dumping the fares into the machine for sounding the gong, and for actuating said passenger register, a driving shaft operated by said lever, means operated by said shaft to carry the coin selectively one by one to counting position, a fare register, mechanical means for driving said register from the coin carrying means, and normally disconnected therefrom, and means operated by the moving coin acting to bring the same into operative connection with said coin carrying means.

15. In a fare register a receptacle for the fare, an inclosed gong, and a passenger register, a hand lever, connections therewith for dumping the fares into the machine for sounding the gong and for actuating said passenger register, a driving shaft operated by said lever, means operated by said shaft to carry the coin selectively one by one to counting position, a fare register, mechanical positively acting means for driving said register from the coin carrying means and normally disconnected therefrom, and means operated by the moving coin acting to bring the same into operative connection with said coin carrying means.

16. In a fare register a receptacle for the fare, an inclosed gong, a passenger register, a hand lever, connections therewith for dumping the fares into the machine for sounding the gong, and for actuating said passenger register mechanically, a driving shaft operated by said lever, means operated by said shaft to carry the coin selectively one by one to counting position, a fare register, mechanical and automatic means for driving said register from said coin carrying means and normally disconnected therefrom, and mechanism operated by each moving coin acting to bring said register into operative connection with said coin carrying means.

17. In a fare register a receptacle for the fare, a passenger register, a hand lever, connections therewith for dumping the fares into the machine and for actuating said passenger register, a driving shaft operated by said lever, means operated by said shaft to carry the coin selectively one by one to counting position, a fare register, mechanical means for driving said register from the coin carrying means and normally disconnected therefrom, means operated by the moving coin acting to bring the same into operative connection with said coin carrying means, and a lock for said register when disconnected from the actuating means.

18. In a fare register of the class described a plurality of registers and operating mechanism therefor, a coin carrying element adapted to carry coins to entrain the operating mechanism with a drive therefor, means locking said mechanism from movement, and means moving said mechanism into unlocked position.

19. In a fare register of the class described registers, single means adapted to simultaneously actuate one directly, and another through the medium of a coin, means moving said latter register in and out of engagement and means locking the same when out of engagement.

20. In a fare register of the class described a plurality of registers, a coin carrying element, one of said registers caused to be actuated by a coin on said element, an operating handle adapted to simultaneously operate another of said registers and said coin carrying element, gearing adapted to be thrown into engagement by a coin on said element, and means moving the same out of engagement when no coin is on said element.

21. In a machine of the class described a plurality of registers, a coin carrying element, cams connected thereto, and slidable gearing adapted to be moved by said cams into and out of entrainment with driving gears to permit actuation of or lock one of said registers, respectively.

22. In a device of the class described registers, a coin carrying element, operating means for a register connected thereto, coin controlled means for throwing one of said registers into gear, means throwing the same out of gear, and mechanism adapted to simultaneously actuate one of said registers and the carrying element.

23. In a machine of the class described, a coin carrying element, a plurality of registers, means actuating one of the same and said carrying element simultaneously, coin controlled slidable mechanism for entraining one of said registers, a ratchet wheel on said mechanism and a fixed pawl adapted to lock said mechanism when the same disentrains the register.

24. In a machine of the class described a register, actuating means therefor, coin operated means entraining said register with said means, means positively holding the same in train, and means positively moving the same out of train.

25. In a device of the class described a plurality of registers, an audible signal, a rotatable coin carrying element, certain of said registers adapted to be actuated thereby, coin controlled means permitting such actuation, and a handle connected to operate certain other of said registers to sound the signal, and to rotate the carrying element.

26. In a fare register of the class described a coin carrying element, a plurality of registers, driving means for certain of said registers rigidly connected to said carrying element, an arm pivoted to be actuated by a coin on said element, a shaft slidably journaled transversely said disk, pinions thereon, and another arm rigidly connected to the aforesaid arm to move therewith and slide said shaft and pinions into engagement with said driving means to operate the register.

27. In a device of the class described a coin receptacle for indiscriminately mixed and varied coins, a carrying element moving therein, certain projections thereon to carry different coins one at a time, registering mechanism, a counting wheel rigidly connected to said carrying element with the counting means arranged to correspond with the certain denominational carrying projections, and means controlled by a coin to connect the counting wheel and the registering mechanism.

28. In a device of the class described a carrying element, projections thereon to carry coin, projections intermediate said carrying projections to prevent lodgment of the coin, and means operating said element and registering the coin.

29. In a device of the class described a coin carrying disk, means for carrying the coin thereon with apertures therebetween, means to project therethrough to dislodge improperly carried coin, and means for turning said disk and registering the coin.

30. In a device of the class described a coin carrying element, projections thereon for engaging the coin to properly carry the same, projections to prevent improper lodgment of the coin, slots in said element, and means adapted to project therethrough to dislodge improperly carried coin as said element is rotated.

31. In a machine for registering and sorting coin, a rotatable disk, projections thereon for carrying coin, slidably mounted gearing, cam mechanism for moving the same, said cam actuatable by a coin, a register and driving means for said gearing.

32. In a device of the class described a coin carrying element, and means projecting from said element moving and rigidly connected therewith to prevent improper carrying of the coin.

33. In a device of the class described a coin hopper, a rotatable coin carrying disk, projections thereon for engaging said coin, registering mechanism constantly moving driving mechanism other than said carrying disk therefor normally disconnected therefrom, and a cam adapted to be moved by a coin to entrain the registering mechanism and the driving mechanism therefor to register the said coin.

34. In a device of the class described a rotatable coin carrying disk, projections thereon to engage the coin, register mechanism therefor, constantly moving driving means therefor, a plurality of sets of teeth thereon corresponding to the denomination of the coin to be registered, and a cam actuated by said coin to entrain the constantly moving driving means and said register mechanism.

35. In a device of the class described a hopper for coins of various denomination, an inclined coin carrying disk therein adapted to carry said various coin, register mechanism, driving means for the same, normally disconnected therefrom, and a spring controlled cam adapted to be moved by the coin to entrain the register mechanism and said driving mechanism.

36. In a machine of the class described a carrying disk for coins of various denomination, a register for the carried coin, constantly moving driving mechanism therefor, a plurality of sets of teeth thereon, the number of teeth in a set corresponding to a certain denomination of coin, a sliding gear to drive the register, and a coin actuated spring controlled cam adapted to move said gear into engagement with one set of said teeth on the driving mechanism.

37. In a device of the class described selective operating means for the register comprising a constantly moving element, a plurality of sets of teeth thereon, a slidable gear adapted to engage one of said teeth sets but normally disconnected therefrom and a coin operated pivoted cam adapted to entrain said slidable gear and said moving element.

38. In a device of the class described a coin carrying element, a register for the coins, driving means for said register, means driving said carrying element and said register driving means simultaneously, and a cam actuated gear connected with said register adapted to be moved into engagement with said register driving means.

39. In a device of the class described a stationary support, means movable thereover for moving the coins in a circular path in a fixed plane, registering mechanism for the coins, driving mechanism therefor, and means adapted to contact the face of a coin while the coin is moving to entrain the registering mechanism with the driving mechanism to effect a register of the coin.

40. In a device of the class described a stationary support, means movable thereover for moving the coins in a circular path in a fixed plane, said moving means comprising different elements for different denominations of coin, and mechanism adapted to contact a moving coin to effect a register of the coin.

41. In a device of the class described a stationery support moving means thereover to move different denominations of coins in a curved path in a fixed plane, a register, gearing connected to said means and timed for coincident movement therewith whereby certain parts of said gearing are in certain position for certain positions of the moving means, and mechanism adapted to contact a moving coin to entrain the register and said gearing to effect a registration thereof according to the denomination of the coin.

42. In a device of the class described a coin carrying means, registering mechanism for the coins, a toothed member connected to be driven synchronously with said coin carrying means, a shiftable gear connected to said registering mechanism and adapted to be moved into engagement with said toothed member, means adapted to be contacted by a coin and acting to shift said gear, and mechanism for maintaining said gear and toothed member entrained.

43. In a device of the class described a rotatable coin carrying wheel, means thereon to selectively pick up and carry coins of different denominations, registering mechanism for the coins, a rotatable member connected to be driven synchronously with said coin carrying wheel, said member having a plurality of groups of teeth thereon, said groups spaced apart and each comprising a different number of teeth, an axially movable gear connected to said registering mechanism, means projecting over the wheel adapted to be contacted by a coin thereon and acting to shift said gear into engagement with one of said groups of teeth, and mechanism for maintaining said gear and toothed member entrained until the coin has been registered.

44. In a device of the class described a rotatable coin carrying wheel, projections thereon to selectively pick up and carry coins of different denominations, a drive for said wheel, registering mechanism for the coins, a member connected to be driven synchronously with said coin carrying wheel, said member having a plurality of groups of teeth thereon, said groups spaced apart and each comprising a different number of teeth, corresponding to the denomination of coin to be registered, a shiftable gear connected to said registering mechanism and adapted to be shifted into engagement with said groups of teeth, and means adapted to be contacted by a coin to shift said gear.

45. In a device of the class described inclined coin carrying means for coins of different denomination, a register for the coins, a member connected to be driven synchronously with said coin carrying means, said member having groups thereon, each comprising a different number of teeth, corresponding to the denomination of coin to be registered, an axially movable gear connected to drive said register, shifting means connected to said gear, a lever adapted to be contacted by a coin to actuate said shifting means to shift said gear into engagement with one of said groups of teeth, and mechanism for positively maintaining said gear and toothed member entrained until the coin has been registered.

46. In a device of the class described an inclined rotatable coin carrying disk, means thereon to selectively pick up and carry coins of different denominations, registering mechanism for the coins, a rotatable toothed member connected to be driven synchronously with said coin carrying disk, corresponding to the denomination of coin to be registered, a movable gear connected to drive said registering mechanism and adapted to be shifted into engagement with said toothed member, and means adapted to be contacted by a coin and acting to shift said gear.

47. In a device of the class described an inclined rotatable coin carrying disk, projections thereon to selectively pick up and carry coins of different denominations, registering mechanism for the coins, a rotatable toothed member connected to be driven synchronously with said coin carrying disk, said member having a plurality of groups of teeth thereon, said groups spaced apart and each comprising a different number of teeth, corresponding to the denomination of coin to be registered, a gear connected to drive said registering mechanism and mounted to be shifted into engagement with one of said groups of teeth, and means connected to said gear to be actuated by a coin on the disk and acting to shift said gear.

48. In a device of the class described coin carrying means, registering mechanism for the coins, a rotatable toothed member connected to be driven synchronously with said coin carrying means, said member having a plurality of groups of teeth thereon, said groups spaced apart and each comprising a different number of teeth, corresponding to the denomination of coin to be registered, shiftable means connected to drive said registering mechanism and adapted to be moved into engagement with one of said groups of teeth, and mechanism acting to shift said gear.

49. In a device of the class described coin carrying means, registering mechanism for the coins, a rotatable toothed member connected to be driven synchronously with said coin carrying means, said member having a plurality of groups of teeth thereon, said groups spaced apart and each comprising a different number of teeth, corresponding to the denomination of coin to be registered, means connected to said registering mechanism and adapted to be moved into engagement with said groups of teeth, mechanism acting to shift said means, and mechanism for positively maintaining said means and toothed member entrained until the coin has been registered.

50. In a device of the class described an inclined coin carrying means, projections thereon to selectively pick up and carry coins of different denominations, registering mechanism for the coins, a rotatable member connected to be driven synchronously with said coin carrying means, said member having a plurality of groups of teeth thereon, said groups spaced apart and each comprising a different number of teeth, corresponding to the denomination of coin to be registered, an axially movable gear connected to drive said registering mechanism and adapted to be moved into engagement with one of said groups of teeth, means acting to shift said gear, and mechanism other than the coin itself for positively maintaining said gear and rotatable member entrained.

51. In a device of the class described an inclined rotatable coin carrying disk for coins of different denominations, a drive therefor, registering mechanism for the coins, a rotatable toothed member connected to said drive to be driven synchronously with said coin carrying disk, said member having a plurality of groups of teeth thereon, said groups spaced apart and each comprising a different number of teeth, corresponding to the denomination of coin to be registered, an axially movable gear connected to drive said registering mechanism, and means connected to said gear and projecting over the disk to be contacted by a coin thereon and acting to shift said gear into engagement with one of said groups of teeth.

52. In a device of the class described an inclined rotatable coin carrying disk, means thereon to selectively pick up and carry coins of different denominations, a drive therefor, registering mechanism for the coins, a rotatable toothed member connected to be driven synchronously with said coin carrying disk, said member having a plurality of groups of teeth thereon, said groups spaced apart and each comprising a different number of teeth, corresponding to the denomination of coin to be registered, an axially movable gear connected to drive said registering mechanism, and means connected to said gear and projecting over the disk to be contacted by a coin thereon and acting to shift said gear into engagement with one of said groups of teeth.

53. In a device of the class described an inclined rotatable coin carrying disk, projections thereon to selectively pick up and carry coins of different denominations, a drive therefor, registering mechanism for the coins, a rotatable toothed member connected to be driven synchronously with said coin carrying disk, said member having a plurality of groups of teeth thereon, said groups spaced apart and each comprising a different number of teeth, corresponding to the denomination of coin to be registered, an axially movable gear connected to drive said registering mechanism, means connected to said gear and projecting over the disk to be contacted by a coin thereon and acting to shift said gear into engagement with one of said groups of teeth, and mechanism for positively maintaining said gear and toothed member entrained until the coin has been registered.

54. In a machine of the class described a stationary support, mechanism movable thereover parallel thereto for moving the coins in a curved path and in a fixed plane of movement, a drive for said mechanism, a register to count the coins, driving means for said register normally out of train therewith and driven continuously with said coin moving mechanism, and means contacting the face of a coin moved by said mechanism operating to entrain said register with the driving means therefor to effect registration of the coin.

55. A fare register embracing a hopper to receive the coin, an inclined carrying element therein for delivering the coin one by one therefrom, register actuating means driven simultaneously with the carrying element, registering mechanism actuatable thereby, gears adapted to be driven from said means to actuate said register and normally out of train, shifting mechanism actuated by contact with the coin to be registered and acting to bring said gears into train, and means independent of the coin for holding the gears en train until the registration is completed.

56. In a device of the class described a rotative coin carrying disk, projections thereon for carrying the coins one by one past registering position, a register, mechanism normally out of train for driving the same, means actuated by a coin at registering position for shifting said mechanism into train to drive the register proportionately with said coin's value, and a detent acting to hold said mechanism en train until the coin is completely registered.

57. In a device of the class described a register, a receptacle for the coin, means operating in said receptacle and acting to carry coin upwardly one by one to registering position, mechanism normally out of train for actuating said register as the coin pass to registering position to register the coin value thereof, shifting means projecting into the path of the moving coin and actuated thereby to bring the register driving means into train, means positively holding said mechanism en train until the coin are registered, and means simultaneously releasing said mechanism and returning the same to normal after the registration.

58. In a device of the class described a hopper, an inclined rotative carrying plate mounted therein, projections thereon arranged in pairs to carry coin to registering position, register actuating means normally out of train, shifting means therefor projecting into the path of the moving coin and acting by engagement therewith to shift the register actuating means into train, and means shifted with the same acting to positively hold the same in registering position until the registration of the coin is effected.

59. In a device of the class described a rotative inclined carrying element, coin carrying projections on the face thereof, a register normally out of train, means operated by the coin to be registered to shift the same into train, means independent of the coin for holding the same en train until registration is completed, and a spring engaged on said holding means and acting to throw the same out of engagement and simultaneously shift the register driving means out of train.

60. In a device of the class described a rotative carrying wheel, projections thereon adapted to successively carry the coin to be registered to registering position, a lever extending at one of its ends into position to be engaged and actuated by coin, a register, means normally out of train driving the same from said coin carrying element, and operating connections between said lever and said register driving mechanism acting to bring and hold the same into train when said lever is engaged by a coin, and to release the same instantly when the registration is completed.

61. In a device of the class described an inclined rotative carrying wheel having coin carrying projections thereon arranged in pairs, the projections of each pair spaced apart a distance to engage and carry a coin therebetween and to reject coin of larger and smaller diameter, a register, means operated by each coin to actuate the register to indicate the coin value of such coin, and means acting independently from the coin to insure complete actuation of the register.

62. In a device of the class described means for elevating the coin, a drive therefor, registering means normally out of train with said drive, means actuated by the passing coins to bring the registering means into train with said drive, and locking means embracing an element actuated by each coin, said locking means acting independently from the coin to hold the registering means *en train* until the completion of the registration of the coin.

63. In a device of the class described a fixed element, a rotatable element moving thereover adapted to engage coins selectively according to the various denominations thereof, a register for counting the coins in accordance with the denomination thereof, driving means for said register operated synchronously with said rotatable element, an oscillatable finger projected into the path of a moving coin to contact the coin, and mechanism operated by said oscillatable finger to entrain the register and driving means therefor.

64. In a device of the class described moving means adapted to select coins according to the denomination thereof and by contact with the periphery of a coin to move the same, a register, driving means therefor operating synchronously with said moving means, and an oscillatable element adapted to contact the upper surface of a coin to entrain the register and driving means.

65. In a device of the class described coin carrying means for coin of different denominations, registering mechanism for the coin, a driving member for said registering mechanism connected for synchronous movement with said coin carrying means and normally out of train with said registering mechanism, a plurality of groups of different numbers of teeth on said driving member, a gear adapted to entrain the registering mechanism and one of said groups of teeth on said driving member in accordance with the denomination of said coin, and a lever adapted to be contacted by a coin to move said gear.

66. In a device of the class described coin carrying means for coin of different demonination, registering mechanism for the coin, a driving member for said registering mechanism connected for synchronous movement with said coin carrying means and normally out of train with said registering mechanism, a plurality of groups of different numbers of teeth on said driving member, a longitudinally movable gear adapted to entrain the registering mechanism with one of said groups of teeth on said driving member in accordance with the denomination of said coin, means adapted to be contacted by a coin to move said gear, and means maintaining said registering mechanism and driving member entrained until the coin is registered.

67. In a device of the class described inclined coin carrying means for coins of different denominations, registering mechanism for the coins, a rotatable driving member for said registering mechanism connected for synchronous movement with said coin carrying means normally out of train with said registering mechanism, a longitudinally movable gear adapted to entrain the registering mechanism and said driving member, and means adapted to be contacted by a coin on the carrying means to move said gear.

68. In a device of the class described coin carrying means for coins of different denominations, registering mechanism for the coins, a rotatable driving member for said registering mechanism connected for synchronous movement with said coin carrying means and normally out of train with said registering mechanism, a longitudinally movable gear adapted to entrain the registering mechanism with said driving member, means adapted to be contacted by a coin on the carrying means to move said gear, means maintaining said registering mechanism and driving member entrained until the coin is registered, and mechanism to disentrain the same after registration of said coin.

69. In a device of the class described a coin carrying disk, projections thereon to pick up and carry coins of different denominations, registering mechanism for the coins, a driving member for said registering mechanism connected for synchronous movement with said coin carrying disk and normally out of train with said registering mechanism, a plurality of groups of different numbers of teeth thereon, a slidably mounted gear adapted to entrain the registering mechanism and one of said groups of teeth on said driving member in accordance with the denomination of said coin, means adapted to be contacted by a coin to move said slidable gear, means maintaining said registering mechanism and driving member entrained until the coin is registered, and mechanism to disentrain the same after the registration of said coin.

70. In a device of the class described an inclined rotatable coin carrying disk, projections thereon to pick up and carry coins of different denomination, registering mechanism for the coin, a driving member for said registering mechanism connected for synchronous movement with said coin carrying disk and normally out of train with said registering mechanism, a plurality of groups of different numbers of teeth thereon, a slidably mounted gear adapted to entrain the registering mechanism and one of said groups of teeth on said driving member in accordance with the denomination of said coin, a lever contacted by a coin to move said slidable gear, means maintaining said registering mechanism and driving member entrained until the coin is registered, and mechanism to disentrain the same after registration of said coin.

71. In a device of the class described a coin carrying element, means removed from the coin carrying element for driving a register, a register normally out of train with said driving means therefor, shifting mechanism operated by contact with the surface of a passing coin to bring the register into train with its driving means, and means holding the register in train independent of said coin until the coin value has been registered on the register.

72. In a device of the class described a coin carrying element, a register for the coin values, driving means normally out of train therewith and removed from the coin carrying element, mechanism adapted to contact the surface of a coin and operated by each coin carried on said carrying element to bring the register into train with its driving means, and a detent acting to hold said register in train independent of the coin until the registration of the money value of said coin.

73. In a device of the class described an inclined rotative coin carrying element, different coin engaging means thereon, one for each denomination of coin to carry that coin only, a hopper for indiscriminately mixed coin supported to discharge to said carrying element, means for driving the carrying element, a register for the coin, driving means normally out of train with the register and independent from said coin carrying element, means operated by each passing coin for bringing the register in train with its driving means, a detent acting to support said mechanisms in train until complete registration of the coin, and means immediately thereafter shifting said mechanisms out of train.

74. In a device of the class described a continuously rotatable coin advancing element, driving mechanism independent from, and rotating simultaneously therewith, and a register normally out of train with the driving mechanism, pivotally supported means for entraining the register with its driving means, and including a shifting lever above the coin advancing element in position to be held elevated by each passing coin, and means acting to maintain the register in train until complete registration of the coin and to release the same from train thereupon.

75. In a machine of the class described an inclined rotative coin carrying wheel, coin carrying projections thereon, said coin carrying wheel having a groove in the face thereof concentric therewith and lying between the coin carrying projections, a tripping lever extending over the face of said wheel, and extending into the groove and adapted to ride over each coin carried therepast on said carrying element, a shifting arm connected with said lever, a register, independently mounted driving means therefor normally out of train therewith, means connected with the shifting arm to bring the same into train when the tripping lever is elevated by each coin, and means holding the same in train until registration of the coin is effected.

76. In a device of the class described a rotative coin advancing element, means for driving the same, a register, rotative driving means for the register normally out of train therewith, and independently mounted from, and driven simultaneously with the coin advancing element, a lever disposed above the coin advancing element in position to be engaged and held elevated by each passing coin, a shifting arm rigidly connected therewith and operatively connected to bring the register in train with its driving means, when said arm is elevated by the coin, and coacting means for holding the same in train independent of the coin until the coin value is registered.

77. In a device of the class described a hopper, an inclined rotative coin carrying plate extending thereinto and affording a part of the bottom thereof, projections on said coin carrying plate adapted to selectively engage and carry the indiscriminately mixed coin from the hopper one by one to a place of deposit, a tripping lever extending into the path of the coin, a register, driving means therefor independent from, and driven simultaneously with the coin carrying element, and normally out of train with the register, operative connections for bringing the register in train with its driving means when the tripping arm is elevated by a coin, and co-acting detents acting to hold the same in train until the coin value is registered.

78. In a device of the class described a rotative coin carrying element, a register, driving means independently mounted and laterally disposed from said coin carrying element, and driven simultaneously therewith, a register adapted to be driven thereby and normally out of train therewith, swingingly supported shifting mechanisms acting to bring the register in train with its driving means when actuated by a passing coin, and means independent from the coin for holding the same in train until registration is complete.

79. In a machine of the class described a rotatable driving shaft, a coin advancing element mounted thereon, a register driving shaft mounted at a distance from said driving shaft, operative connections between said shafts for driving the same simultaneously, a register, means on the register driving shaft for driving the register, and normally out of train therewith, a lever extending above the coin advancing element to be held elevated successively by each coin advanced thereby, shifting means connected with said lever for entraining the register with its driving means, and means independent of the coin for holding the same in train until the coin is registered.

80. In a device of the class described a flat coin advancing element, a drive therefor, a plurality of different means adapted to engage coins of different denominations, a register to register the coins in accordance with the denomination thereof, and means entraining the register with the drive for said advancing element by contact with the surface of a coin advanced by said element.

81. In a device of the class described a flat coin advancing element to carry coins laying flat thereon, a register for registering the coins, driving means for said advancing element and said register, and means actuated by contact with the surface of a coin advanced by said element to entrain said registering mechanism with said driving means to actuate the register.

82. In a device of the class described means advancing a coin to counting position, a register, mechanism for properly actuating the register in accordance with the denomination of coin advanced by said means, and a pivotal shifting mechanism actuated by contact with the surface of a coin being advanced by said carrying means to entrain said register mechanism to register the coin.

83. In a device of the class described coin advancing and supporting means, a register for the coin, gearing to drive said register in accordance with the denomination of coin advanced by said means, driving means connected to said advancing means to drive the registering mechanism, and pivotal means normally engaging a slot in a part of said means but adapted to be held elevated therefrom by a coin being advanced thereby to entrain said register with said registering mechanism to register the coin.

84. In a device of the class described a coin moving element, differently spaced projections thereon adapted to engage coins of different denomination, a register, driving mechanism therefor disposed to move coincidently with the movement of said coin moving element whereby the proper actuating mechanism for a coin of particular denomination is in position to be registered when certain of said projections are in certain position, and means adapted to contact the coin carried by a projection to entrain the register with said register actuating mechanism to properly register the coin carried.

85. In a device of the class described an inclined coin carrying element, means for driving the same, a register, actuating mechanism for said register, driving connections between said coin carrying element and said register actuating mechanism, a pivoted arm mounted adjacent said coin carrying element adapted to contact coins thereon, another arm connected thereto, and a sliding gear actuatable by said latter arm to entrain the register with the register actuating mechanism to register a coin passing on said element.

In testimony whereof we have hereunto subscribed our names in the presence of two subscribing witnesses.

JAY M. JOHNSON.
H. J. BAUER.

Witnesses:
LAWRENCE REIBSTEIN,
CHARLES W. HILLS, Jr.